United States Patent Office 3,439,056

Patented Apr. 15, 1969

3,439,056

MACROCYCLIC COMPOUNDS PREPARATION

Nissim Calderon, Akron, Ohio, assignor to The Goodyear Tire & Rubber Company, Akron, Ohio, a corporation of Ohio No Drawing. Filed Sept. 1, 1967, Ser. No. 664,907
Int. Cl. C07c 3/10, 3/18, 3/12
U.S. Cl. 260—666 4 Claims

ABSTRACT OF THE DISCLOSURE

The invention described is one of preparation of unsaturated large ring alicyclic compounds by subjecting unsaturated alcyclic hydrocarbons containing 4 or 5 carbon atoms containing one double bond and unsaturated alicyclic hydrocarbons containing 8 or more carbon atoms containing at least one carbon-carbon double bond and containing no conjugated double bonds to a catalyst which is a mixture of (a) at least one organometallic compound wherein the metal is from Groups I*a*, II*a*, II*b* and III*a* of the Periodic Table of Elements, (b) at least one metal salt wherein the metal is selected from the group of molybdenum and tungsten and (c) at least one compound of the general formula RYH wherein Y is from the group of oxygen and sulfur and R is a radical selected from the group of hydrogen, alkyl, aryl, aralkyl, alkaryl and alkenyl and when Y is S, R may be a thioalkyl, thioaralkyl and a thioalkaryl and when Y is O, R is an alkoxy, alkaryloxy or a aralkoxy and radicals of alkyl, aryl, aralkyl, alkaryl, and alkenyl which a hydrogen is substituted by a thiol or a hydroxyl group. These unsaturated large ring cycle compounds are useful as intermediates to produce such things as large ring ketones which in turn are useful as perfume bases.

This invention relates to a novel method of preparation of unsaturated large ring alicyclic compounds and the products obtained thence. More particularly, it concerns with the conversion of various organic unsaturated materials, which will be classified extensively later, into compounds possessing large alicyclic rings containing at least one carbon to carbon double bond by exposure of said unsaturated materials to catalysts whose compositions are described elsewhere in this specification.

The term "unsaturated large ring alicyclic compounds," used throughout the present invention, relates to the group of materials characterized by the presence of at least one alicyclic ring containing at least twelve carbon atoms in said ring skeleton and at least two carbon atoms of the said ring are connected by a double bond.

Prior to the present invention, a common method of synthesis of large ring alicyclic compounds from acyclic precursors involved the intramolecular reaction of a linear alpha, omega-disubstituted compound. For instance the acyloin condensation:

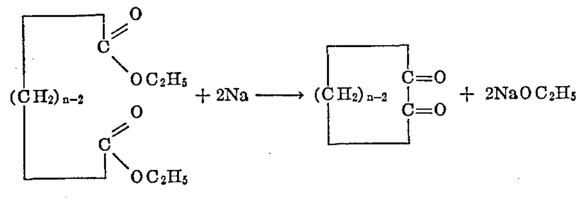

According to the present invention, at least one alicyclic unsaturated hydrocarbon selected from the group consisting of: (A) alicyclic compounds corresponding to the formula:

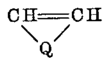

wherein:

(1) Q is a fragment which comprises a sequence of at least 6 carbon atoms situated in linear succession between the methylidene carbons which constitute the double bond;
(2) the carbon atoms in the linear succession of Q may be interconnected by both carbon-carbon single bonds and carbon-carbon double bonds;
(3) any of the carbon atoms in the linear succession of Q may be substituted by at least one member from the group of alkyl, aryl, alkenyl, aralkyl, alkaryl, cycloalkyl, cycloalkenyl, bicycloalkyl and bicycloalkenyl radicals;
(4) any of said carbon atoms in the linear succession of Q may be constituents of aromatic rings and alicyclic rings; and
(5) said alicyclic unsaturated hydrocarbon contains no conjugated double bonds;

and (B) alicyclic compounds corresponding to the formula:

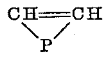

wherein (1) P is a fragment which comprises a sequence of at least 2 and not more than 3 carbon atoms situated in linear succession between the methylidene carbons which constitute the double bond;
(2) the carbon atoms in linear succession of P are connected by carbon to carbon single bonds;
(3) any of the carbons in the linear succesion of P may be substituted by at least one substituent member from the group of alkyl, aryl, alkenyl, aralkyl, alkaryl, cycloalkyl, cycloalkenyl, bicycloalkyl and bicycloalkenyl radicals;
(4) any of said carbons in linear succession of P may be constituents of aromatic rings and alicyclic rings, and
(5) said alicyclic unsaturated hydrocarbon compound contains no conjugated double bonds is converted into at least one macrocyclic compound possessing alicyclic unsaturated rings containing at least 12 carbons and containing at least one carbon to carbon double bond.

As previously indicated, it is possible to prepare large ring unsaturated alicyclic compounds from smaller unsaturated alicyclic precursors. These small, 4 or 5 carbon atoms cycloolefins, and medium-size, 8 or more carbon atoms cycloolefins, which polymerize by a ring opening mechanism forming polymers containing carbon to carbon unsaturation along the polymer chains may undergo simultaneously an intramolecular olefin metathesis process leading to the formation of large ring unsaturated alicyclic compounds. It has been discovered that the ring opening polymerization of small and medium-size unsaturated, alicyclic monomers can be modified substantially to form larger unsaturated, alicyclic compounds by conducting the reaction in high dilutions. One may adjust the reaction conditions by employing sufficient amounts of diluent which lead to the enhancement of the intramolecular mode of reaction, thus, obtaining a high proportion of the large ring unsaturated alicyclic compounds. A dilution of about 10% or more of the small and medium-size unsaturated alicyclic compounds in an inert diluent will usually cause the mode of reaction to be intramolecular and form high proportions of the large ring unsaturated alicyclic compounds. However, a dilution to about 5% or more of the alicyclic unsaturated molecules in the inert diluent is more preferable. Suitable diluents for this purpose are liquids which do not adversely affect the catalyst activity or the olefin methathesis reaction. Representative of such diluents are saturated hydrocarbons such as butane, heptane, hexane, pentane and the like or aromatic hydrocarbons such as benzene, toluene and the like. Hydrocarbons which contain other substituents may also be employed provided that they are inert.

The product mixture of these large ring alicyclic compounds can be conveniently separated from any high molecular weight polymer which may be formed due to the intermolecular mode of reaction from the ring opening polymerization of the small and medium-size alicyclic compounds by extraction with a choice of suitable solvents. The separation of the mixture of the large ring unsaturated alicyclic compounds to its individual components according to ring sizes can be accomplished by one skilled in the art by using a choice of methods. Such known methods would be fractional distillations at reduce pressures, molecular distillations, elution, chromatography, vapor phase chromatography and gel permeation chromatography.

The alicyclic compound useful in the preparation of the products of this invention are those containing 5 or less carbon atoms and those containing 8 or more carbon atoms. Representative of such alicyclic compounds are cyclobutene, cyclopentene, cyclooctene, 1,4- and 1,5-octadiene, cyclononene, 1,4- and 1,5-cyclononadiene, 1,4,7-cyclononatriene, cyclodecene, 1,4-, 1,5- and 1,6-cyclodecadiene, 1,4,6- and 1,4,7-cyclodecatriene, cycloundecene, 1,4-, 1,5- and 1,6-cycloundecadienes and 1,4,7- and 1,4,8-cycloundecatriene, cyclododecene, 1,4- 1,5-, 1,6- and 1,7-cyclododecadiene, 1,4,7-, 1,4,8-, 1,4,9- and 1,5,9-cyclododecatriene.

The conversion of the alicyclic compounds which are the starting materials of this invention to form the large ring alicyclic unsaturated hydrocarbons containing at least 12 carbon atoms is conducted in the presence of a catalyst system which will cause the conversion to take place.

A class of catalysts employed in the macrocyclization reaction of this invention is a combination comprising: (A) at least one organometallic compound wherein the metal is selected from the group consisting of I*a*, II*a*, II*b*, and III*a* groups of the Periodic Table of Elements, (B) at least one metal salt wherein the metal is selected from the group consisting of molybdenum and tungsten, and (C) at least one compound of the general formula R—Y—H wherein Y is selected from the group of oxygen and sulfur and wherein R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl, (8) when Y is O, R is alkoxy, arylalkoxy and alkaryloxy and radicals of (2) through (6) wherein at least one hydrogen is substituted by a material selected from hydroxyl (OH) and thiol (SH) groups. The Periodic Table of Elements referred to may be found in the Handbook of Chemistry and Physics, 44th edition, April 1962 reprint, published by the Chemical Rubber Publication Company, Cleveland, Ohio, U.S.A., p. 448.

Representative examples of metals from which the organometallic compound, the first or (A) component of the catalyst system of this invention, can be derived are lithium, sodium, potassium, rubidium, cesium, beryllium, magnesium, calcium, strontium, barium, zinc, cadmium, aluminum, gallium, indium, and thallium. The preferred organometallic compounds are compounds of lithium, sodium, magnesium, aluminum, zinc, and cadmium with aluminum being most preferred.

Representative examples of organometallic compounds useful as the first or (A) catalyst component of this invention are aluminum compounds having at least one aluminum-to-carbon bond. Representative of such compounds are trialkylaluminums such as trimethylaluminum, triethylaluminum, tri-n-propylaluminum, tri-n-butylaluminum, triisopropylaluminum, triisobutylaluminum, trihexylaluminum, trioctylaluminum and the like; triarylaluminums such as tritolylaluminum, tribenzylaluminum, triphenylaluminum and the like; dialkylaluminum halides such as diethylaluminum chloride, di-n-propylaluminum chloride, diisobutylaluminum chloride, diethylaluminum bromide, diethylaluminum iodide and diethylaluminum fluoride and the like; mixtures of dialkyl-aluminum halides and alkylaluminum dihalides such as ethylaluminum sequichloride and bromides may also be employed; alkylaluminum dihalides such as ethylaluminum dichloride, ethylaluminum dibromide, propylaluminum dichloride, isobutylaluminum dichloride, ethylaluminum diiodide and the like; dialkylaluminum hydrides such as diethylaluminum hydride, di-n-propylaluminum hydride, diisobutylaluminum hydride and the like; arylaluminum hydrides and dihydrides such as diphenylaluminum hydride and phenylaluminum dihydride, the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide and the like. Other organometallic compounds are also useful in the practice of this invention. Representative of such organometallic compounds are organoalkali metal compounds such as alkyllithium compounds as ethyllithium, n-butyllithium, t-butyllithium, and the like; lithium-aluminum-tetraalkyls such as lithium-aluminum-tetrabutyl, lithium-aluminum-tetraethyl and the like; alkali metal alkyls and aryls such as amylsodium, butylpotassium, phenylpotassium, phenylsodium, phenyllithium, butyllithium and the like; magnesium alkyls and aryls such as diphenylmagnesium, diethylmagnesium, ethylmagnesium chloride, phenylmagnesium chloride, butylmagnesium bromide and the like; calcium, strontium and barium organo compounds such as barium alkyls and aryls; alkyls and aryls of Group II*b* metals such as diethylzinc, diphenylzinc, ethylzinc chloride, diethylcadmium, dibutylcadmium and the like; Grignard agents such as phenylmagnesium bromide may also be employed. Mixtures of these compounds may be employed as the first or (A) catalyst component in the catalyst of this invention. It is usually preferred to employ aluminum compounds such as trialkylaluminums, dialkylaluminum halides, alkylaluminum dihalides and aluminum-sesquihalides.

The metal salts employed in the catalyst of this invention as the second or (B) catalyst component are selected from the salts of molybdenum and tungsten. Representatives of such salts include halides such as chlorides, bromides, iodides, and fluorides, which include compounds such as molybdenum pentachloride, tungsten hexachloride, molybdenum pentabromide, tungsten hexabromide, molybdenum pentaiodide, tungsten hexaiodide, molybdenum pentafluoride, molybdenum hexafluoride and tungsten hexafluoride. Other representative salts are those of acetylacetonates, sulphates, phosphates, nitrates and the like which include compounds such as molybdenum phosphate, tungsten phosphate, molybdenum nitrate, tungsten nitrate, molybdenum acetylacetonate, tungsten acetylacetonate, molybdenum sulphate, and tungsten sulphate. Mixtures of these salts may also be employed. Of these, it is usually preferred to employ tungsten halides and molybdenum halides representative of which are tungsten hexachloride and molybdenum pentachloride.

The third or (C) component of the catalyst system of this invention are compounds which respond to the formula R—Y—H wherein Y is selected from the group consisting of oxygen and sulfur and R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl, (8)

when Y is O, R is alkoxy, arylalkoxy and alkaryloxy and (9) radicals of (2) through (6) wherein at least one hydrogen of R is substituted by at least one hydroxyl (OH) or thiol (SH) group.

Thus, the formula above defines a number of types of compounds. It defines water (HOH), hydrogen sulfide (HSH), both saturated and unsaturated alcohols (ROH), mercaptans (RSH), hydroperoxides (ROOH), hydrodisulfides (RSSH), polyalcohols (HOROH), polymercaptans (HSRSH), and hydroxy mercaptans (HSROH) or thioalcohols (HORSH). Representative examples of the materials responding to the formula above are alcohols representative of which are methanol, ethanol, isopropanol, tertiarybutyl alcohol, amyl alcohol, benzyl alcohol, allyl alcohol, 1,1-dimethyl benzyl alcohol, phenol, tertiarybutyl catechol, alpha and beta naphthyl alcohol; mercaptans such as methyl, ethyl, propyl, isopropyl, butyl, amyl and similar mercaptans, allyl mercaptan, thiophenol, 4-methylthiophenol, 4-mercaptophenol; the hydroperoxides such as cumyl hydroperoxide, tertiarybutyl hydroperoxide; the hydrodisulfides such as cumyl hydrodisulfide, t-butyl hydrodisulfide; the polyalcohols such as ethylene glycol, glycerol, and similar polyglycols; catechol, resorcinol, hydroquinone, pyrogallol; the polymercaptans such as 1,3-propane dithiol, 1,4-dithiobenzene; the hydroxymercaptans or thioalcohols such as ethane-2-ol-1-thiol, 1-hydroxy-4-thiobenzene.

One of the unusual and distinguishing features of the catalyst system of this invention is that the compound of the formula R—Y—H, wherein R and Y have been previously defined, depending on the particular diolefin employed, the particular organometallic compound and the particular Group VI*b* metal salt chosen and on the particular R—Y—H compound chosen, when employed in fairly substantial amounts are known to reduce drastically the activity of the olefin metathesis reaction by which the macrocyclization of this invention occurs. An unexpected high activity of the catalyst of the present invention was found when compounds of the R—Y—H type were employed in relatively small amounts and added according to the teachings set forth in the present specification and examples. Since the instant invention contemplates the use of organometallic compounds in combination with transition metal salts and various oxygen and sulfur-containing compounds, and since various factors or considerations will influence the optimum range of the three catalyst components in relation to each other, the molar ratios of the three components which optimize the reaction conditions cannot be readily set forth. However, by following the teachings found in this application, those skilled in the art can readily determine the optimum molar ratio of the three catalyst components to each other. Obviously if one employs the oxygen or sulfur-containing compound, or as is designated above, component C in relatively large amounts, the activity of the catalyst will be reduced considerably or even destroyed.

It has been found that good results are obtained in the practice of this invention when the molar relationship between the three catalyst components, A, B, and C as previously defined, are within a molar ratio of $B/C$ ranging from about 0.3/1 to at least about 20/1 and the molar ratio of $A/B$ is within the range of about 0.5/1 to at least 15/1. More preferred ratios are $B/C$ of 0.5/1 to 5/1 and $A/B$ of 0.5/1 to 8/1. Still more preferred ratios were $B/C$ of 1/1 to 2/1 and $A/B$ of 0.75/1 to 5/1.

The catalysts employed in this invention are prepared by mixing the components by known techniques. Thus, the catalysts may be prepared by "preformed" or "in situ" techniques. By the "preformed" method the catalyst components are mixed together prior to exposure of any of the catalyst components to the unsaturated compound to be used in the macrocyclization reaction. In the "in situ" method the catalyst components are added separately to the unsaturated compound to be used in the macrocyclization reaction. The catalyst components may be mixed either as pure compounds or as suspensions or solutions in liquids which do not adversely affect catalyst activity or the olefin metathesis reaction. Representative of such liquids are saturated hydrocarbons such as hexane, pentane and the like or aromatics such as benzene, toluene and the like.

While the presence of the unsaturated precursor is not essential during the formation of active catalyst by a mixing of components A, B and C and this fact facilitates the use of "preformed" catalysts, it has been found that freshly preformed catalysts are generally more active than catalysts which have been allowed to age before use.

The order of addition of the three catalyst components to each other is of interest in the practice of this invention. There are various methods in which the three catalyst components can be brought into contact with the unsaturated precursor or unsaturated precursor/solvent mixture. The following is a numerical listing of these various methods in which A, B and C stand for the catalyst components as previously defined:

(1) Simultaneous addition of A, B and C.
(2) C followed by A and B which were previously preformed.
(3) A and B preformed followed by C.
(4) A followed by B and C which were preformed.
(5) B and C preformed followed by A.
(6) B followed by A and C which were preformed.
(7) A and C preformed followed by B.
(8) A followed by B followed by C.
(9) B followed by A followed by C.
(10) C followed by B followed by A.
(11) C followed by A followed by B.
(12) B followed by C followed by A.
(13) A followed by C followed by B.
(14) Preformed A, B and C which was prepared by adding A to B and C preformed.
(15) Preformed A, B and C which was prepared by adding B to A and C preformed.
(16) Preformed A, B and C which was prepared by adding C to A and B preformed.

Of these various procedures, procedures (6), (7), (11), (13), and (15) listed above are methods of preparation which reduce somewhat the catalyst activity. The remaining of the listed procedures (1), (2), (3), (4), (5), (8), (9), (10), (12), (14) and (16) lead to the most active catalyst systems.

The amount of catalyst employed in the macrocyclization reaction of this invention may be varied over wide concentrations and has not been found to be critical. Of course, a catalytic amount of the catalyst must be employed. The optimum amount of catalyst depends upon a number of factors such as temperature, unsaturated precursors used, purity of precursors, reaction times desired and the like. Those skilled in the art will readily determine the optimum catalytic ranges. The macrocyclization can be conducted wherein the amount of catalyst employed is about 0.01 part by weight of B per 100 parts by weight of unsaturated precursor employed, with components A and C adjusted to yield a desirable atomic ratio of $A/B/C$.

The practice of this invention is further illustrated by reference to the following examples which are intended to be representative rather than restrictive of the scope of the invention.

EXAMPLE I

A series of reactions was carried out whereby cyclooctene was converted into a mixture of macrocyclics having the general formula:

$$(C_8H_{14})_n$$

by polymerizing cyclooctene in the presence of a catalyst comprising a mixture of tungsten hexachloride ($WCl_6$) and ethyl alcohol and ethyl aluminum dichloride (EADC). The $WCl_6$ was 0.05 molar in benzene. The ethanol was pre-reacted with $WCl_6$ in equal molar quantities. The EADC was 0.20 molar in benzene. The various amounts and other relevant data was given in the table below. Each of the polymerizations were allowed to react 15 minutes and were then terminated by the introduction of the 2.0 ml. benzene solution containing 0.03 gram of tetraethylene pentamine and 0.02 gram of di-ter-butyl-p-cresol and evaporated to dryness. The evaporated mixture was extracted three times with 50 ml. portions of 1:1 volume ratio of isopropanol hexane solvent system and a low molecular weight extractable portion thus isolated. These low molecular weight extractables are reported as macrocyclics in percent in the table below.

These data illustrate that dilutions favor the formation of macrocyclics.

EXAMPLE II

A 1.75 ml. sample of cyclooctene was dissolved in benzene to form a 50 ml. solution. Under nitrogen atmosphere, 0.5 ml. solution of $WCl_6/C_2H_5OH$ (1:1) in benzene of 0.05 molar concentration was added followed by 0.5 ml. EADC of 0.2 molar concentration. The mixture was sampled at variable times and analyzed by gas chromatography using cyclooctane as an internal standard. The following table contains the observed data regarding the composition of the mixture with respect to conversion.

| Reaction No. | Conversion (Percent) | Remaining Cp. (Percent) | Cyclic $C_{16}$ (Percent) | Cyclic $C_{24}$ (Percent) | Cyclic $C_{32}$ (Percent) | Other (Percent) |
|---|---|---|---|---|---|---|
| 1 | 47 | 53 | 11 | 6 | 1 | 29 |
| 2 | 77 | 23 | 18 | 9 | 3 | 47 |
| 3 | 88 | 12 | 22 | 15 | 5 | 46 |
| 4 | 90 | 10 | 19 | 13 | 5 | 53 |
| 5 | 91 | 9 | 20 | 12 | 7 | 52 |
| 6 | 93 | 7 | 18 | 12 | 6 | 57 |
| 7 | 95 | 5 | 20 | 12 | 4 | 59 |
| 8 | 97 | 3 | 19 | 12 | 5 | 61 |

Parent mass spectroscopic analysis by low voltage mass spectroscopy was carried out and it was found that the extractable mixture was comprised of components possessing molecular weights according to the series:

$$220+n\times110$$

($n$=0, 1, 2, 3 . . . ). This corresponds to a dimer (when $n$=0), a trimer (when $n$=1), a tetramer (when $n$=2), and so forth, of the repeating monomer unit of the original polyoctenamer, that is $$-CH_2-CH=CH-CH_2-(CH_2)_4-$$

The Nuclear Magnetic Resonance spectroscopic analysis (NMR) of the low molecular weight extractable portion indicates the presence of one vinylene double bond for every eight carbons, similar to cyclooctene and polyoctenamer, and possessing three types of hydrogens (A) vinylic: (CH=CH); (B) allylic: ($CH_2$—CH=CH); and (C) methylenic: ($CH_2$). The relative ratio of vinylic/allylic/methylenic types of hydrogens was found to be essentially 1/2/4. Methyl hydrogens: ($CH_3$) or terminal unsaturation type of hydrogens: ($CH=CH_2$) were not detected in the MNR spectrum.

Hence, the mass spectroscopy and NMR spectroscopy results reveal that the low molecular weight extractable portion consists of a mixture of macrocyclics of the general forumla:

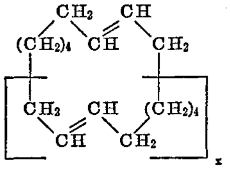

where $x$=1, 2, 3 . . .

For $x$=1, the ring is of 16 carbons, 2 double bonds and has a molecular weight of 220. For $x$=2, the ring is of 24 carbons, 3 bouble bonds and has a molecular weight of 330. For $x$=3, the ring is of 32 carbons, 4 double bonds and has a molecular weight of 440. This series of molecular weights is consistent with the experimentally determined low voltage mass spectroscopy and the structure presented above is consistent with the NMR spectrum analysis.

The data demonstrates that it is possible to convert cyclooctene to 1,9-cyclohexadecadiene with a selectivity of about 25%.

While certain representative embodiments and details have been shown for the purpose of illustrating the invention, it will be apparent to those skilled in this art that various changes and modifications may be made therein without departing from the spirit or scope of the invention.

What is claimed is:

1. A macrocyclization process which comprises subjecting at least one alicyclic unsaturated hydrocarbon selected from the group consisting of (A) alicyclic compounds corresponding to the formula:

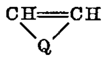

wherein (1) Q is a fragment which comprises a sequence of at least 6 carbon atoms situated in linear succession between the methylidene carbons which constitute the double bond;

(2) the carbon atoms in the linear succession of Q may be interconnected by both carbon-carbon single bonds and carbon-carbon double bonds;

(3) any of the carbon atoms in the linear succession of Q may be substituted by at least one member from the group of alkyl, aryl, alkenyl, aralkyl, alkaryl, cycloalkyl, cycloalkenyl, bicycloalkyl and bicycloalkenyl radicals;

(4) any of said carbon atoms in the linear succession of Q may be constituents of aromatic rings and alicyclic rings; and (5) said alicyclic unsaturated hydrocarbon contains no conjugated double bonds

| | Cyclooctene (ml.) | Benzene (ml.) | $WCl_6/C_2H_5OH$(1:1) (moles$\times10^4$) | EADC (moles$\times10^4$) | Macrocyclics (Percent) |
|---|---|---|---|---|---|
| Reaction No.: | | | | | |
| 1 | 5 | 95 | 0.5 | 2.0 | 46.2 |
| 2 | 4 | 96 | 0.5 | 2.0 | 48.5 |
| 3 | 3 | 97 | 0.5 | 2.0 | 73.2 |
| 4 | 2 | 98 | 0.5 | 2.0 | 91.4 |
| 5 | 1 | 99 | 0.5 | 2.0 | 98.3 |

and (B) alicyclic compounds corresponding to the formula:

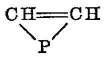

wherein:

(1) P is a fragment which comprises a sequence of at least 2 and not more than 3 carbon atoms situated in linear succession between the methylidene carbons which constitute the double bond;
(2) the carbon atoms in linear succession of P are connected by carbon to carbon single bonds;
(3) any of the carbons in the linear succession of P may be substituted by at least one substituent member from the group of alkyl, aryl, alkenyl, aralkyl, alkaryl, cycloalkyl, cycloalkenyl, bicycloalkyl and bicycloalkenyl radicals;
(4) any of said carbons in linear succession of P may be constituents of aromatic rings and alicyclic rings; and
(5) said alicyclic unsaturated hydrocarbon compound contains no conjugated double bonds;

while said hydrocarbon is diluted to about 10% in an inert diluent to a catalyst which is a mixture of (a) at least one organo-metallic compound wherein the metal is from Groups I*a*, II*a*, II*b* and III*a* of the Periodic Table of Elements, (b) at least one metal salt wherein the metal is selected from the group of molybdenum and tungsten, and (c) at least one compound of the general formula RYH wherein Y is from the group of oxygen and sulfur and R is a radical selected from the group of hydrogen, alkyl, aryl, aralkyl, alkaryl and alkenyl and when Y is S, R may be a thioalkyl, thioaralkyl and a thioalkaryl and when Y is O, R is an alkoxy, alkaryloxy or an aralkoxy and radicals of alkyl, aryl, aralkyl, alkaryl and alkenyl in which a hydrogen is substituted by a thiol or a hydroxyl group to form at least one macrocyclic compound possessing alicyclic unsaturated rings comprising at least 12 carbon atoms and containing at least one carbon-to-carbon double bond.

2. A method according to claim 1 in which the organometallic compound of (a) is an organoaluminum compound, the transition metal salt of (b) is a tungsten halide and in the compound defined in (c), Y is oxygen.

3. A method according to claim 2 wherein the compound defined in (c) is an alcohol.

4. A macrocyclization process of claim 1 in which the alicyclic hydrocarbon employed is an 8-membered alicyclic unsaturated compound.

References Cited

UNITED STATES PATENTS

| | | | |
|---|---|---|---|
| 3,257,332 | 6/1966 | Ziegler | 252—429 |
| 3,259,610 | 6/1966 | Grammer et al. | 260—85.5 |

FOREIGN PATENTS

| | | |
|---|---|---|
| 6601466 | 8/1966 | Netherlands. |
| 6605105 | 10/1966 | Netherlands. |
| 667,392 | 11/1965 | Belgium. |
| 1,425,601 | 1/1966 | France. |

DELBERT E. GANTZ, *Primary Examiner.*

V. O'KEEFE, *Assistant Examiner.*

U.S. Cl. X.R.

260—93.1